W. HOLTORP.
MEANS FOR LUBRICATING BEARINGS.
APPLICATION FILED NOV. 9, 1916. RENEWED DEC. 2, 1919.

1,376,094.

Patented Apr. 26, 1921.
2 SHEETS—SHEET 1.

Inventor:
Wilhelm Holtorp
by his attorney

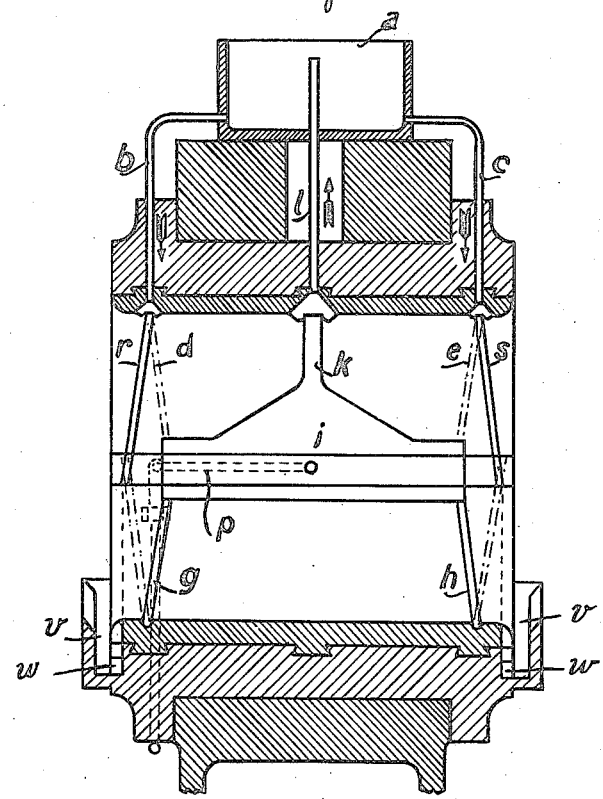

UNITED STATES PATENT OFFICE.

WILHELM HOLTORP, OF HAMBURG, GERMANY.

MEANS FOR LUBRICATING BEARINGS.

1,376,094. Specification of Letters Patent. Patented Apr. 26, 1921.

Application filed November 9, 1916, Serial No. 130,341. Renewed December 2, 1919. Serial No. 342,012.

*To all whom it may concern:*

Be it known that I, WILHELM HOLTORP, a citizen of Germany, and residing at Hamburg, Germany, have invented some new and useful Improvements in Means for Lubricating Bearings, of which the following is a specification.

This invention relates to means for lubricating bearings and the object of it is to provide means for lubricating every part of the rotating shaft inside the bearing sufficiently and without any waste of oil. I attain this object by the arrangement illustrated in the accompanying drawing, in which—

Figure 1:
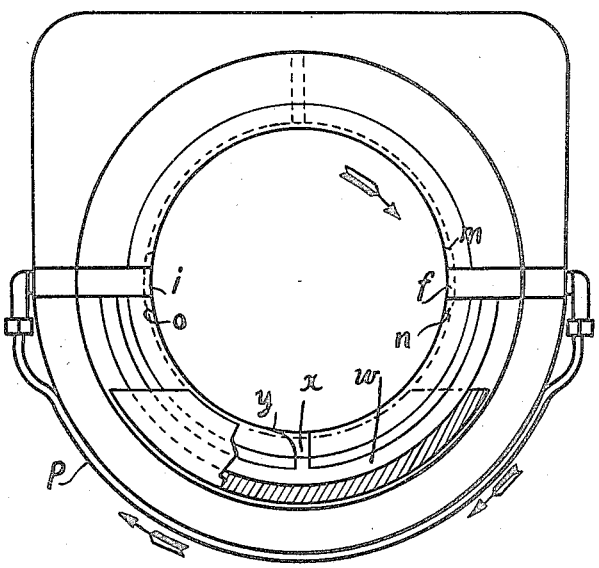
Figure 2:
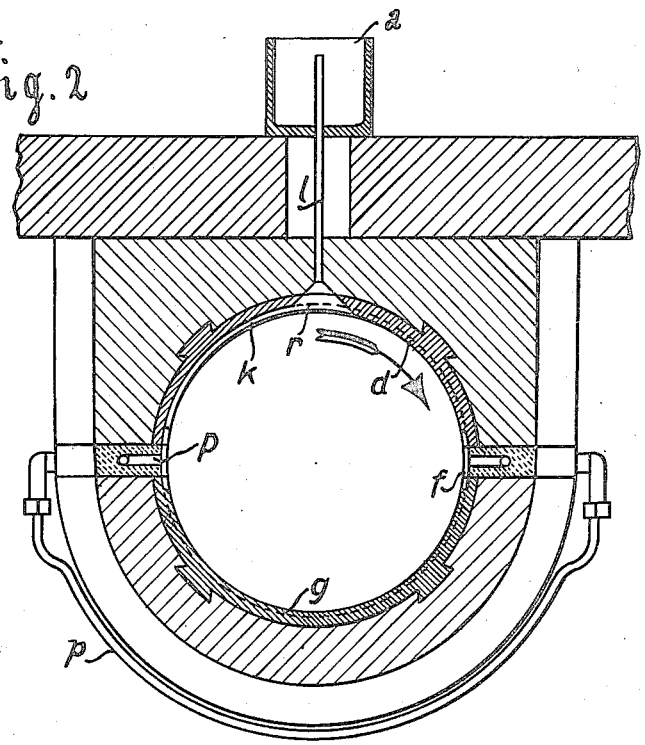

Figure 1 is a front view of a bearing embodying my invention;

Fig. 2, a cross section thereof, and

Fig. 3, a longitudinal section.

Hitherto the bushing of a bearing has been provided with notches or grooves along which the oil was led in order to lubricate all parts of the rotating shaft. But with such an arrangement parts of the shaft were liable to remain unlubricated. When using helical grooves the carrying surface of the bushing is lessened accordingly while the pressure working against the same is increased considerable. Furthermore these narrow grooves are rather apt to become obstructed by dust or any other filthy substance the entering of which cannot be fully prevented. Finally the grooves will contract under the action of the shaft pressing heavily against the bushing. It is obvious that thus a fully sufficient lubrication of the bearing cannot be warranted and serious trouble in working the machine might occur.

According to my invention an oil cup $a$ is arranged on the top of and forms a part of the bearing. The grooves $d$ and $e$ are cut into the upper part of the bushing and communicate by the pipes $b$ and $c$ with the oil cup $a$ to lead the oil in the direction of the rotating shaft into the receptacle $f$ that extends about nearly the full width of the bushing. The shaft rotating as indicated by the arrow carries the oil from the receptacle $f$ to another one $i$ located opposite where the oil accumulates. The receptacles $f$ and $i$ are located in the indifferent zone of the bearing where there is no pressure at all caused by the shaft working against the bushing. The carrying over of the oil is assisted by the shaft working somewhat like a sucking pump. The oil will pass from the receptacle $i$ along the groove $k$ and through the rising pipe $l$ back to the oil cup $a$ thus making a continuous circulation as long as the shaft rotates.

To avoid a surcharge within any part of the grooves caused by the oil accidentally sticking to the receptacle $f$ there is arranged a communication that leads from the receptacle $f$ to the other one $i$ and which may consist in a pipe $p$ or in any other convenient device.

The rotating shaft being alternately under working pressure will make what might be called a pulsating motion and by this motion the oil is likely to be driven out the bearing sidewise. In order to prevent this wasting of the oil the bushings have got near their outer edges the grooves $r$, $s$, $g$, and $h$ wherein the oil accumulates to be driven back to the receptacles $f$ and $i$ and at last to the oil cup $a$.

It may happen accidentally by leakage or from other causes that some oil accumulating between the bushing and the casting of the bearing escapes by way of the joints and gets lost. To avoid such waste an oil cup $v$ is arranged on either side of the bearing underneath the shaft. To facilitate the entering of the oil a groove $w$ is provided on the front of the bearing at the lowest part of which another groove $x$ is provided that reaches as far up as the shaft. The edge $y$ of the grove $x$ is rounded so that the revolving shaft is apt to draw the oil from the receptacle $v$ to carry it to the receptacle $i$ from where it will ascend to the upper oil cup $a$ as described before.

The essential feature of the invention consists in the arrangement of the two oil receptacles opposite each other and extending about the full width of the bushing. The oil is continuously led to one of the receptacles from where it is carried to the other one by the rotating shaft to be accumulated and to be returned back to the oil cup.

On account of the receptacles having nearly the full width of the bushing all parts of the shaft within the bushing will be permanently and sufficiently lubricated.

Another essential feature is to be considered in the receptacles being located in the indifferent zone of the bearing.

What I claim is:

1. A lubricating bearing comprising a bushing having a pair of outer grooves and an inner groove, a pair of receptacles located in the indifferent zones of said bushing opposite each other, one of said receptacles communicating with the outer grooves, while the other receptacle communicates with the inner groove, an oil cup, and pipes that connect said oil cup with said outer grooves and inner groove.

2. A lubricating bearing as set forth in claim 1, in which the bushing is provided in proximity to its outer edge, with grooves that communicate with the receptacles.

3. In a bearing having an oil cup on either side below the shaft, a groove running around the shaft, an ascending groove having a rounded edge on one side and ascending from the lowest part of the circular groove up to the shaft.

4. A lubricating bearing as set forth in claim 1, in which the receptacles are connected to each other by a pipe.

WILHELM HOLTORP.